(12) United States Patent
Tran et al.

(10) Patent No.: US 12,204,571 B2
(45) Date of Patent: Jan. 21, 2025

(54) CONTENT PUBLISHER RECOMMENDER

(71) Applicant: BIGTINCAN MOBILE PTY LTD, Sydney (AU)

(72) Inventors: Thaison Tran, Sydney (AU); George Ye, Sydney (AU); David Keane, Boston, MA (US)

(73) Assignee: BIGTINCAN MOBILE PTY LTD, Sydney (AU)

( * ) Notice: Subject to any disclaimer, the term of this patent is extended or adjusted under 35 U.S.C. 154(b) by 0 days.

(21) Appl. No.: 18/253,201

(22) PCT Filed: Nov. 11, 2021

(86) PCT No.: PCT/AU2021/051338
§ 371 (c)(1),
(2) Date: May 16, 2023

(87) PCT Pub. No.: WO2022/104409
PCT Pub. Date: May 27, 2022

(65) Prior Publication Data
US 2024/0004908 A1    Jan. 4, 2024

(30) Foreign Application Priority Data

Nov. 19, 2020    (AU) .............................. 2020904279

(51) Int. Cl.
*G06F 16/00* (2019.01)
*G06F 16/2452* (2019.01)
(Continued)

(52) U.S. Cl.
CPC .... *G06F 16/3334* (2019.01); *G06F 16/24522* (2019.01); *G06F 16/3335* (2019.01);
(Continued)

(58) Field of Classification Search
CPC .................................................. G06F 16/24522
See application file for complete search history.

(56) References Cited

U.S. PATENT DOCUMENTS

| 2013/0110823 | A1  | 5/2013 | Su et al. |
| 2015/0081696 | A1* | 3/2015 | Ogawa ................... G06Q 50/01 707/736 |

(Continued)

FOREIGN PATENT DOCUMENTS

EP    2763421 A1    8/2014

OTHER PUBLICATIONS

Covington et al., Deep neural networks for youtube recommendations. In Proceedings of the 10th ACM conference on recommender systems, Sep. 2016, pp. 191-198. Whole of document, in particular sections 3-5.

(Continued)

*Primary Examiner* — Ajith Jacob
(74) *Attorney, Agent, or Firm* — Hunton Andrews Kurth LLP

(57) ABSTRACT

Disclosed is a content publisher recommender system comprising: a server; a content database, configured within the server, within which are stored one or more channels associated with an end user, wherein the one or more channels stores at least one end user identification and a user historical database including a time log of the end user's activity, a log of search phrases used by the end user, a record of results identified on the search phrases; a ranking of the record of results, a record of which results the end user interacts with and a record of the format of the first clicked results from an end user wherein the search phrases are analysed using natural language processing to reduce the terms of the search phrases to their root form, the terms of the phrase are broken down into their part of speech and all keywords identified during natural language processing have stop words (Continued)

removed; and wherein considerations of the stored data and the analysis provides a ranking for searching to provide recommended content.

6 Claims, 6 Drawing Sheets

(51) Int. Cl.
    *G06F 16/33*     (2019.01)
    *G06F 40/253*     (2020.01)
    *G06F 40/268*     (2020.01)
    *G06F 40/289*     (2020.01)

(52) U.S. Cl.
    CPC .......... *G06F 40/253* (2020.01); *G06F 40/268* (2020.01); *G06F 40/289* (2020.01)

(56) References Cited

U.S. PATENT DOCUMENTS

| | | |
|---|---|---|
| 2015/0347920 A1 | 12/2015 | Medlock et al. |
| 2019/0155916 A1 | 5/2019 | Huang et al. |
| 2019/0266283 A1 | 8/2019 | Shukla et al. |

OTHER PUBLICATIONS

International Search Report issued by the Australian Patent Office to PCT/AU2021/051338 dated Jan. 31, 2022.

\* cited by examiner

| Date | User | Phrase | Tags | |
|---|---|---|---|---|
| XX-XX-XXXX | ##### | COVID | covid (PNN) | Proper noun |
| XX-XX-XXXX | ##### | COVID scheme | covid (PNN), plan (NN) | |
| XX-XX-XXXX | ##### | Covid 19 relief plan | covid (PNN), 19, relief, plan (NN) | Noun in this context. Could be verb in others |
| XX-XX-XXXX | ##### | Covid Talking News | covid (PNN), talk (NN), news (NN) | |
| XX-XX-XXXX | ##### | The Covid 19 plan | covid (PNN), 19, plan (NN) | |
| XX-XX-XXXX | ##### | COVID scheme | covid (PNN), plan (NN) | |
| XX-XX-XXXX | ##### | Covid Update | covid (PNN), news (NN) | Baseform |
| XX-XX-XXXX | ##### | Covid Outbreak | covid (PNN), spread (NN) | |
| XX-XX-XXXX | ##### | Covid 19 News | covid (PNN), 19, news (NN) | |
| XX-XX-XXXX | ##### | Sales and Covid 19 | sales (NN), covid (NN), 19 | |
| XX-XX-XXXX | ##### | Covid talk | covid (NN), talk (NN) | |
| XX-XX-XXXX | ##### | Bigtincan Plan | Bigtincan (PNN), plan (NN) | |
| XX-XX-XXXX | ##### | Social Justice | social (NN), justice (NN) | |
| XX-XX-XXXX | ##### | company policy | company (NN), plan (NN) | Adverb |
| XX-XX-XXXX | ##### | How to Code | how (AV), code (NN) | "to" is removed |
| XX-XX-XXXX | ##### | How to Code | how (AV), code (NN) | |
| XX-XX-XXXX | ##### | How to Code | how (AV), code (NN) | |
| XX-XX-XXXX | ##### | Data Science Plans | data (NN), science (NN), plan (NN) | Singular form |
| ... | ... | ... | ... | |

CONTENT PUBLISHER RECOMMENDER

CROSS-REFERENCE TO RELATED APPLICATION

This is a U.S. National Stage Application filed under 35 U.S.C. § 371 based on International Patent Application No. PCT/AU2021/051338, filed on Nov. 11, 2021, which claims priority to Australian Patent Application No. 2020904279 filed on Nov. 19, 2020, the disclosures of both of which are incorporated herein by reference in their entireties.

FIELD

The present invention relates generally to the use and exchange of electronic content and, in particular, a system for managing and suggesting content to a content publisher.

BACKGROUND

The use and exchange of electronic content (e.g., text, audio, images, audiovisual or multimedia material, executables) between users is one of the key functions of any business. To provide a material advantage to businesses in this space, the nature of the content made available to users in this space should be current and refreshed with relevant, targeted material.

In any Content Management System (CMS) system, there is a requirement to ensure that the content ecosystem is refreshed with content that is relevant to what the current population of users would like to use. Furthermore, this would feed any content recommender that works within the ecosystem to ensure that it does not run out of relevant content to recommend.

Content Publishers can only guess what content should be generated based on reports that illustrate the historic success of content created. Furthermore, feedback from content publishers is that most of the time, they look at the reports for historic guidance but mainly tend to guess what content would be relevant to today's business priorities, market, and workforce.

This method lacks a lot of precision when it comes to the generation of effective content that the workforce would actually use based on the changing market and priorities. This method also lacks the ability to ensure:
- the appropriate users are given access to the content
- the content is generated in the right format
- content is made easily accessible in the appropriate location
- content is compliant based on user accessibility and topic appropriate prioritization of content Content publishers need to consider all of the above for each piece of content they generate. In the case where this is done well, it would still take a significant amount of time.

A need therefore exists for a more efficient, less subjective and more reliable method of recommending electronic content for delivery to one or more users.

SUMMARY

It is an object of the present invention to overcome, or at least ameliorate, one or more disadvantages of existing arrangements.

In accordance with one aspect of the present invention, there is disclosed a content publisher recommender system comprising: a server; a content database, configured within the server, within which are stored one or more channels associated with an end user, wherein the one or more channels stores at least one end user identification and a user historical database including a time log of the end user's activity, a log of search phrases used by the end user, a record of results identified on the search phrases; a ranking of the record of results, a record of which results the end user interacts with and a record of the format of the first clicked results from an end user wherein the search phrases are analysed using natural language processing to reduce the terms of the search phrases to their root form, the terms of the phrase are broken down into their part of speech and all keywords identified during natural language processing have stop words removed; and wherein considerations of the stored data and the analysis provides a ranking for searching to provide recommended content.

Preferably, attributes are associated with the record of results, the attributes comprising:
- a positive attribute for results that have more results than others;
- a positive attribute for engagement for an extended period of time;
- identification of the format of first clicked results.

Preferably, engagement for more than 30 seconds is considered positive.

Other aspects of the invention are also disclosed.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 4 is a table of data extracted in phase two of the content publisher recommender of FIG. 3;

FIG. 5 is a table of data extracted and the processing of the data in phase three of the content publisher recommender of FIG. 3;

DETAILED DESCRIPTION

Figure 1:
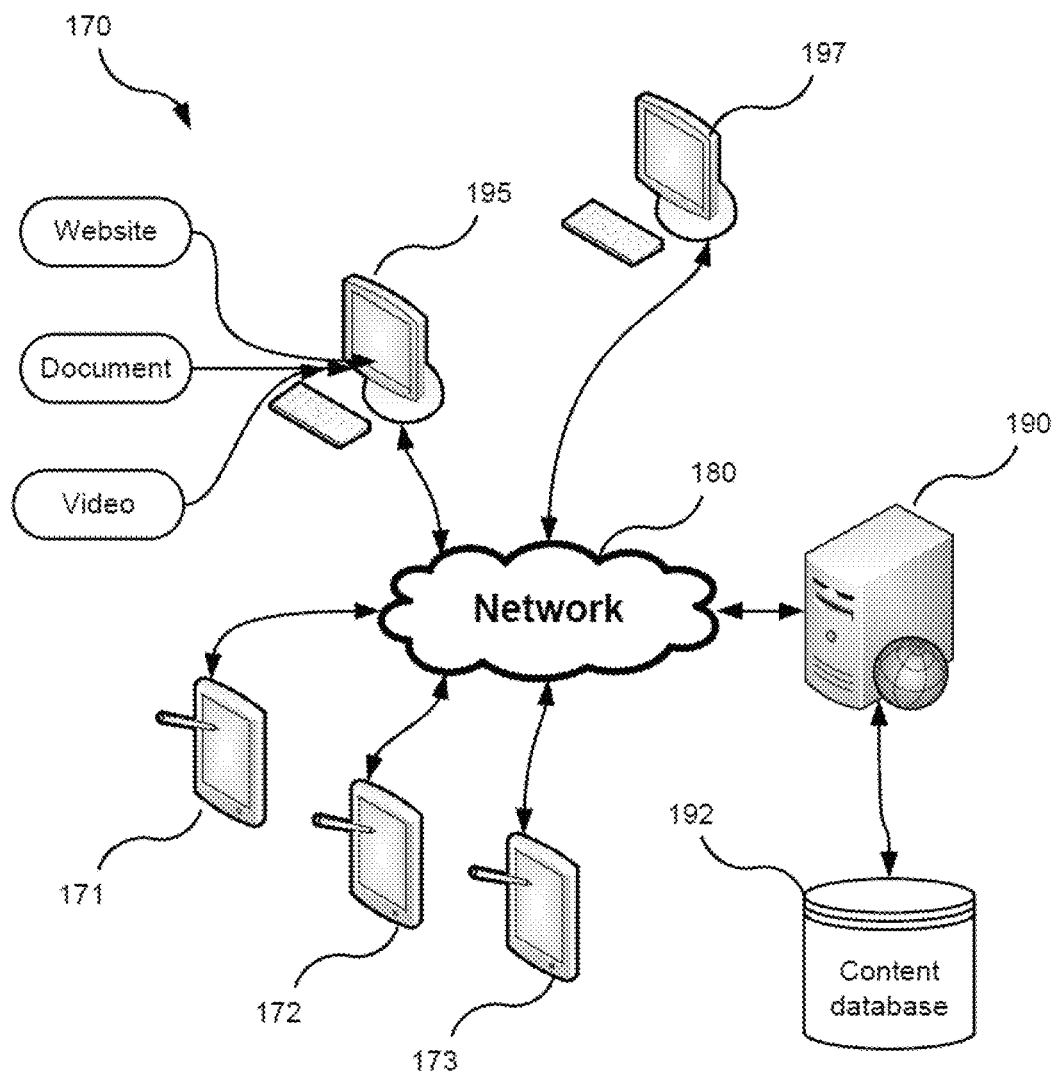
FIG. 1 is a block diagram of a content management system according to one embodiment.

Where reference is made in any one or more of the accompanying drawings to steps and/or features, which have the same reference numerals, those steps and/or features have for the purposes of this description the same function(s) or operation(s), unless the contrary intention appears.

FIG. 1 is a block diagram of a content publisher recommender 170 according to one embodiment of the invention. A content publisher user (not shown), operating a user device, either a user computer 195 or a mobile computing device or "tablet" 171, 172, or 173, enters a number of fields to identify the user, set search parameters, stamp the interaction, identify and categorise search results and provide pathways to published content. The user enters a search term or phrase based on the type of content they wish to produce, which is then sent to a content management server 190. The entered search term or phrase is processed by the server 190. The server 190 categorises the search term or phrase and processes the categorised elements to order content and suggest to the user, based on their search and their entered fields, the type of content to publish for end users who may have access to those stories. An administrator (not shown) operating an administrator computer 197 is responsible for administering the system 170, including creating users, and creating groups and channels. Information regarding the usage of the stored content by users is also stored on the server 190 and used to preferentially present content to end users based on potential relevance or importance to those users.

Detailed descriptions of the various processes mentioned above appear below.

The server 190 is connected to a communications network 180. The communications network 180 may be a wide-area network (WAN), such as the Internet, a cellular telecommunications network, or a private WAN. The user computer 195, administrator computer 197, and a "push" server (not shown), and an applications server (not shown) are also connected to the network 180, over which they may communicate with the server 190.

The system 170 uses a content store architecture, whereby content may be added dynamically to, and referenced from, a content database 192 configured within the server 190. The user computer 195 may be used to interrogate the content database 192 before being referenced to content files stored on the server 190. The user computer 195 may be configured with a secure application programming interface (API). The content files may then be retrieved and transmitted to the user computer 195 by the server 190 before being displayed on the user computer 195.

The methods to be described below may be implemented as one or more software applications (not shown) executable within the computer system.

With reference to FIG. 1 of the present application examples of the attributes required by the content publisher recommender 170 to perform recommendation procedures and to present recommendations. In a first phase, phase 0, are illustrated. The date and/or time that the a content publisher enters a search term or phrase is entered in time column 15. This gives a time based context to the search and can influence the suggested content to publish based on events occurring at that time. A user identification is entered in a user id column 17. The user identification can be an individual user recognition, a company recognition or a combination of both. This can be used to present content to publish to a content publisher user suitable to their individual or company profile.

A searched phrase is shown in search phrase column 19 that is the base on which categorization is applied as discussed below. Results column 21 shows the number of results identified from the search of phrases in search phrase column 19. Click through column 23 shows how many of the results identified from the search of a phrase resulted in an end user interacting with the result to examine the result. The format column 25 displays the format of the content of the first clicked search result of the searched term or phrase. The average duration column 27 shows the average time spent by a end user looking at the results of the phrase search. The ranking column 29 displays preferences for results identified from the search ad discussed below.

Figures 2, 3:
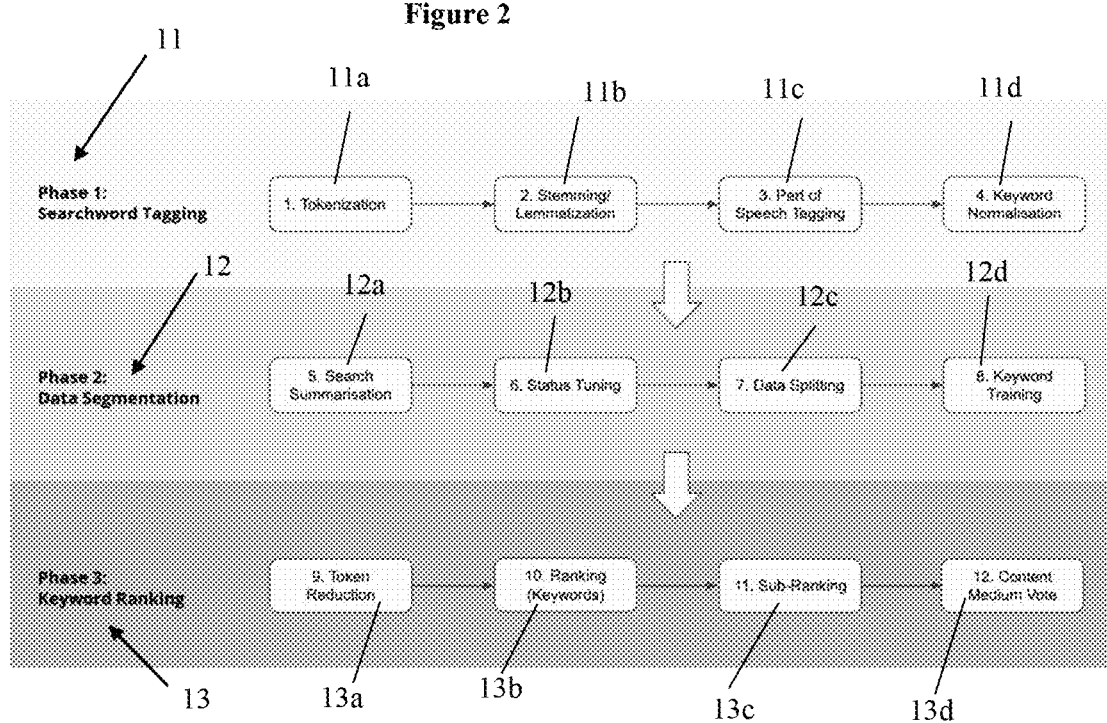
FIG. 2 is a table of data extracted of the main attributes utilized in phase 0 of the content publisher recommender of the present invention.
FIG. 3 is a flow chart of phases of a content publisher recommender according to a first embodiment of the present invention
Figure 5:
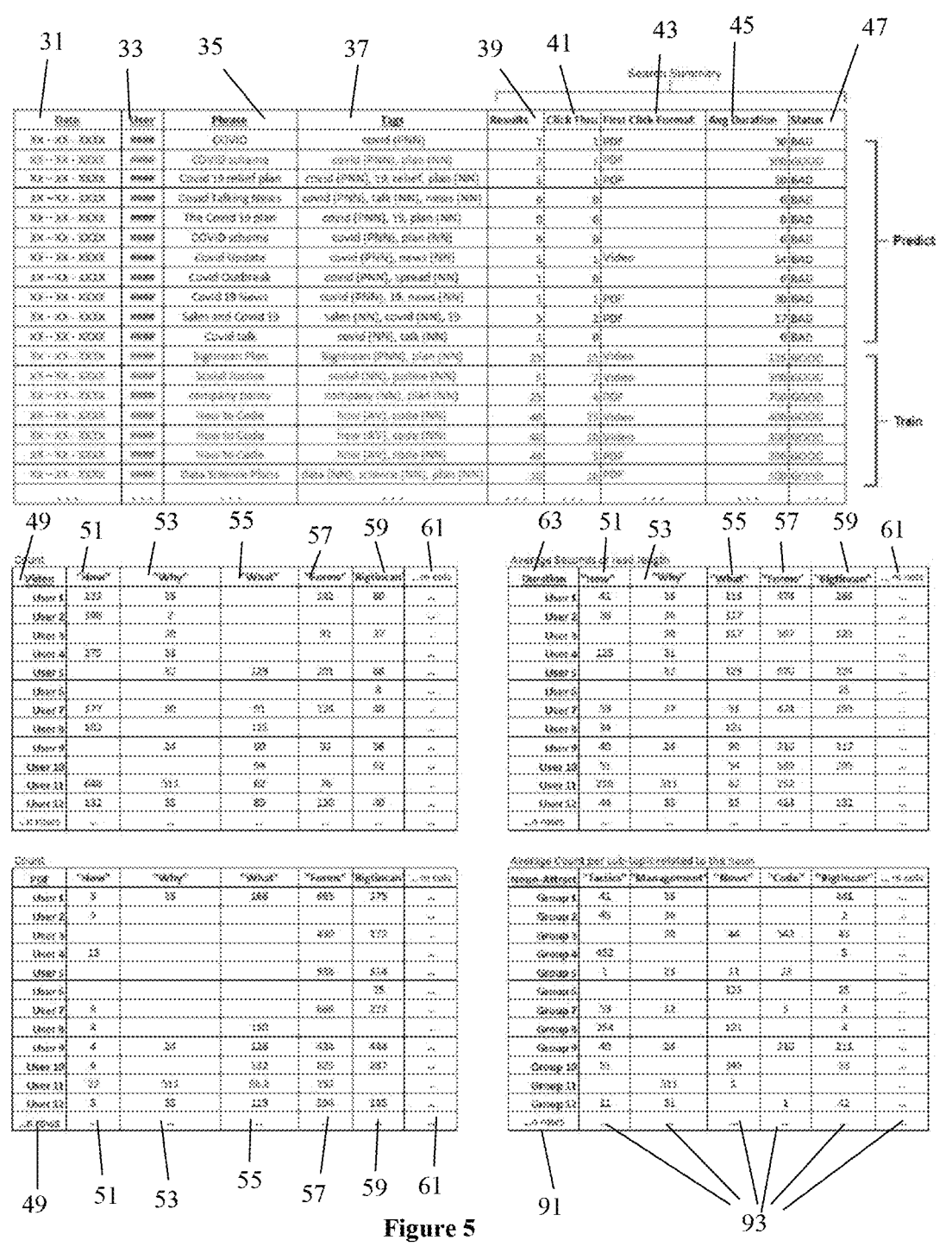
Figure 6:
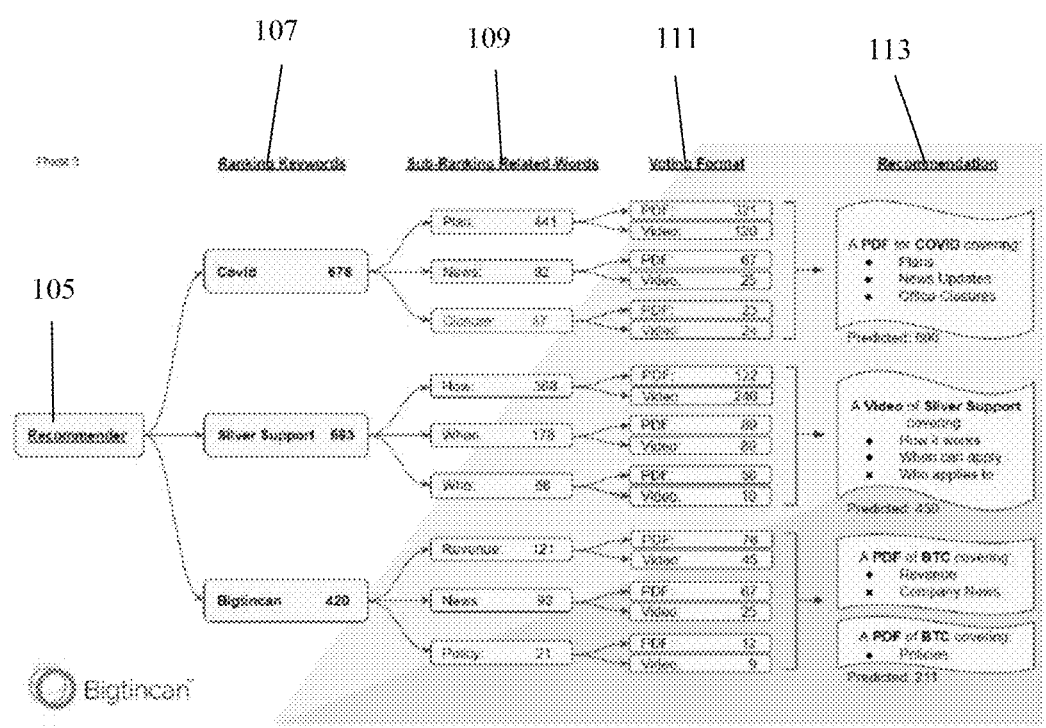
FIG. 6 is a flow chart illustrating a recommendation from the content publisher recommender of the present invention.
Figure 7:
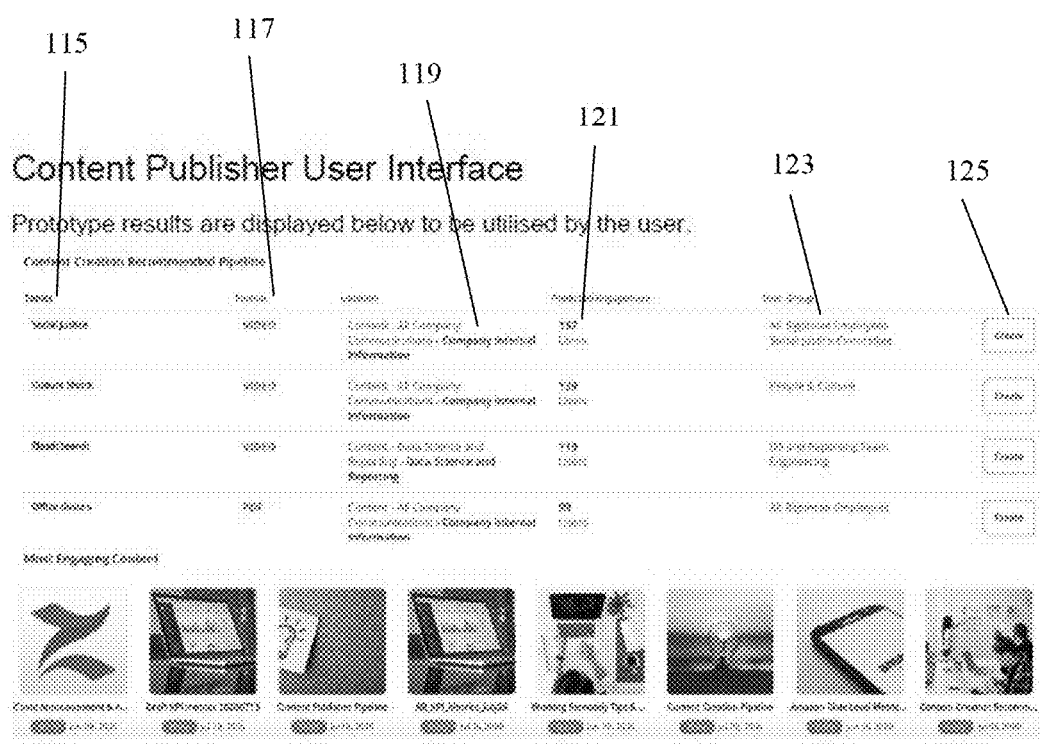
FIG. 7 is a screen shot of recommendations prepared by the recommender of the present invention.

FIG. 3 broadly illustrates phases of implementing the content publisher recommender 170, FIG. 4 illustrates data extracted during phase 1 of the content publisher recommender 170. FIG. 5 illustrates the data extracted during phase 2 of the content publisher recommender 170. FIG. 6 illustrates data extracted during phase 3 of the content publisher recommender 170. These stages will now be described in further details.

Natural Language Processing (NLP) is used to consider, categorise and label each word in each search term or phrase as discussed below with respect to phase 1.

Phase 1 is search word tagging 11 that involves categorising and tagging search terms or phases 35 that would be used by an end user of the CMS. Phase 1 involves tokenization step 11*a*, stemming/lemmatization step 11*b*, part of speech tagging step 11*c* and keyword normalization step 11*c*.

Tokenization step 11*a* separates all the words in the search phrase 35 to individual words 36 which will be used later on for processing and to become tags 37 of each search phrase for a filtering process.

Stemming/lemmatization step 11*b* reduces variations of words by identifying and changing the words 34 to their root form thus retaining the same meaning.

Part of speech tagging step 11*c* identifies the role 38 of each word 34 in the phrase i.e. if they are a 'noun', 'pronoun', 'adjective', 'adverb' etc. To identify the role 38 of the word, open source libraries can be linked to and referenced. In alternative embodiments users can improve the identification process for specific cases, where company names or models of items with codes are searched by training it on their own data, thereby providing a unique reference language database.

Keyword normalization step 11*d* normalizes all the keywords as normalized keywords 36 extracted through NLP by lower-casing them and removing stop words, such as conjunctions, to prevent processing unnecessary words and their high usage will prevent proper ranking and mining.

Phase 2 is data segmentation 12 that adds metadata to the search results to identify what datasets should be statistically trained (good searches) which will in conjunction to predict and recommend (bad searches).

Search summation step 11*a* summarises each search by adding attributes to them. This will be used to determine if the search is successful and determining other factors such as preferred file format in some embodiments.

The added attributes include:

- The number of results found 39 in search: High results suggest successful;
- The number of results clicked 41 by an end party user from results in the search: High results clicked indicates variety of content;
- Average file viewing duration 45: This is an integral metric of the present invention. I measures the average file viewing duration from an end user for all files opened. Also, this could determining if good content is losing interest and prompts the content publisher user to post an updated form or a variation of it if the nature of the content allows it;
- First file format clicked 43 by end users: Usually the first file format clicked 43 in a search is how the clicking user prefers their format to be expressed with those associated keywords used. If there is too little content and users are forced to choose an undesired format, it attracts labelling as bad and is discarded from the training set.

Status tuning step 12b considers whether interactions by an end user are to be considered 'Good' or 'Bad' as status 47, with "Good" indicating a positive result and "Bad" indicating a negative result. In an embodiment a period of time longer than 30 seconds of file-read/open duration by an end user is considered a 'Good' search and anything lower or null was a 'bad' search. This threshold could be different for different use cases/business. E.g. If it's a lecture video, the threshold will be higher as end users might not know the content until later into the content, other examples include, if they cannot track duration then click-thru is their next best option or if trackable, the number of downloads and share counts or if it's a forum content, then number of chained clicks (i.e. post pages) the follow through a topic. A variety of thresholds for a variety of scenarios are available in databases of the system 170 that are used to identify the status 47 that attaches to a given scenario.

With a status determined, data splitting step 12c is performed by the content publisher recommender 170 to use historical data to train the content publisher recommender 170. Historical 'Good' searches are used to train distinct keywords to have specific attributes and 'Bad' searches are used for predicting what content to produce. This data is fed back into the system, 170 to refine the system 170.

Further content publisher recommender 170 training is performed at keyword training step 12d.

Searches deemed to be 'Good' are used to associate distinct keywords with attributes that include:

Desired format: The statistical count of the initial clicked format in the database 59 would determine what users want such as searching how 51, why 53 or what 55, or on the type of document 57. E.g. User A have used 'How' multiple times in different search words the past the count of desired format is 300 videos and 100 pdfs. This means users like to watch videos learning the 'flows' of the topic in the business. This then suggests to the content publisher user that this type of content should be highly listed.

Desired content length 63: Can be text length or video. Users of certain words prefer certain video or text length. E.g. "how" content will be desired to be longer than "what" contents.

Rate of increase: Instead of total view counts, we can use rate to determine if it is a new trend or a dying trend regardless of the total popularity.

Noun-type attraction: Certain types of words 93 could attract roles and types of users—noun-types specifically. An example would be every time the word 'Tactic' is used, it attracts 200 sales users and could be used to add on-top of the 'bad' search users of the word if it did not include those sales users.

Keyword training is unique to each end user. This is to properly correlate the users in the words used in 'Bad' searches and only include their desires. This results in a table or matrix of users by keyword and what content medium they prefer or duration they like for each word or both if it's a multi-dimensional matrix with multiple attributes for prediction. Although the training is unique to each end user, the results of each end user's searches and interactions are fed into the larger system 170 that all end user's use.

Then Keyword ranking 13 is performed. Keyword ranking uses the keywords in the 'bad' search result that was split and ranks them in ranking 107 based on most frequent times they have been used in searches by unique users, or ranks them based on total accumulated predicted user view added from the 'noun-type-attraction'.

Token reduction step 13.1 recognises that end users often provide duplicate search phrases throughout a day or over a period of time and that the number of results received varies depending on the nature of the end user's access and in variations in content available. The content available can vary due to the constant refining of the recommended content to provide. The system 170 eliminates duplicate entries in search phrases from a single end user and taking the results with the largest number of occurrences to remove bias weighting attached to certain search phrases or users that would otherwise distort the ranking of results.

Ranking of keywords step 13b, ranks 107 main keywords by count or predicted users—preferably ranking noun-types but could be anything depending on use-case e.g. verbs if it's an exercise organisation or gym. Non-nouns words such as "the", "is", "what" are repeated unnecessarily so it is not ranked however are could for building context so it is ranked in the next layer.

Sub-hierarchy step 13c assumes that for each main keyword there will be other words used in conjunction with them that are given a sub-ranking 109 ie. non-noun types e.g. "when", "where", "red". This allows automation of creating content with what users might want inside the suggested topic giving it context and also gauging the specific interest while creating the content.

This also groups search in the correct topic for quality content and prevents reposting the same topic after finding out more sub-topics to mention later on because it was ranked much lower.

Depending on how rich the search results are and the use-case, the Sub-Hierarchy Ranking can be further broken down n-times. If it is poor data, then only the topic will show with no Sub-Hierarchy Ranking.

Content medium vote step 13d uses the trained data in and associates it to "bad" search words to create a prediction 111 on the form of what the end user will desire their information in.

Only data for the end users who searched the specific ranking word in the prediction "unless" otherwise and make a total count for vote. E.g. Users A, B, C . . . Z is in the Content Recommended topic of "Covid". We would include the total vote of all of them to be either "Video" or "PDF". If there's no data it will mean a cold start.

Cold-start: If it's a 'bad' search term including words with new users of no historical data, then it will use all (or filtered for a particular time) of the broader end user pool data that is relevant to that end user, for example the company user data to which the end user is associated. Example, a new recruit User X, with no historical data, searches "How to Backflip?" and gets no results. This would be labeled as bad and used as a prediction but there's no desired format data from this user so it uses all the company user data and finds out that "Backflip" has no data but "How" is preferred as a video by most so it's recommends a video to be made for "How to backflip?".

The highest ranked results for a particular end user are then presented as content recommendations to the end user.

The disclosed aspects provide a self improving content recommendation system for content publishers that uses an end user's historical preferences in addition to external considerations to provide content recommendations.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A content publisher recommender system comprising:
   a. a server including a processor;
   b. a content database, configured within the server, the content database storing data, associated with an end user, a associated with; user historical database including a time log of the end user's activity; associated with a log of search phrases used by the end user; associated with a record of results identified on the search phrases; associated with a record of which results the end user interacts with; associated with a record of the format of a set of first clicked results; associated with the average time a user views the results the user interacts with; and a ranking of the record of results;
      wherein the ranking of the results is provided by processing of the data by the server and includes consideration of attributes associated with the record of results, the attributes comprising positive or negative attributes, positive attributes and longer average view times giving a higher ranking;
   wherein the search phrases are processed by the server using natural language processing to reduce the terms of the search phrases to their root form, the terms of the phrase are broken down into their part of speech and all keywords identified during natural language processing have stop words removed;
   wherein the ranking of results is used to provide a recommendation to a user on content.

2. The system according to claim 1, wherein attributes are associated with the record of results, the attributes comprising a positive attribute for results that have more results than others.

3. The system according to claim 1, wherein attributes are associated with the record of results, the attributes comprising a positive attribute for engagement for an extended period of time.

4. The system according to claim 1, wherein attributes are associated with the record of results, the attributes comprising identification of the format of first clicked results.

5. The system according to claim 3, wherein engagement for more than 30 seconds is considered positive.

6. The system according to claim 1, wherein the analysis of search phrases includes lemmatizing the search phrases.

* * * * *